J. W. MILROY.
Rotary Cultivator.
No. 77,830. Patented May 12, 1868.
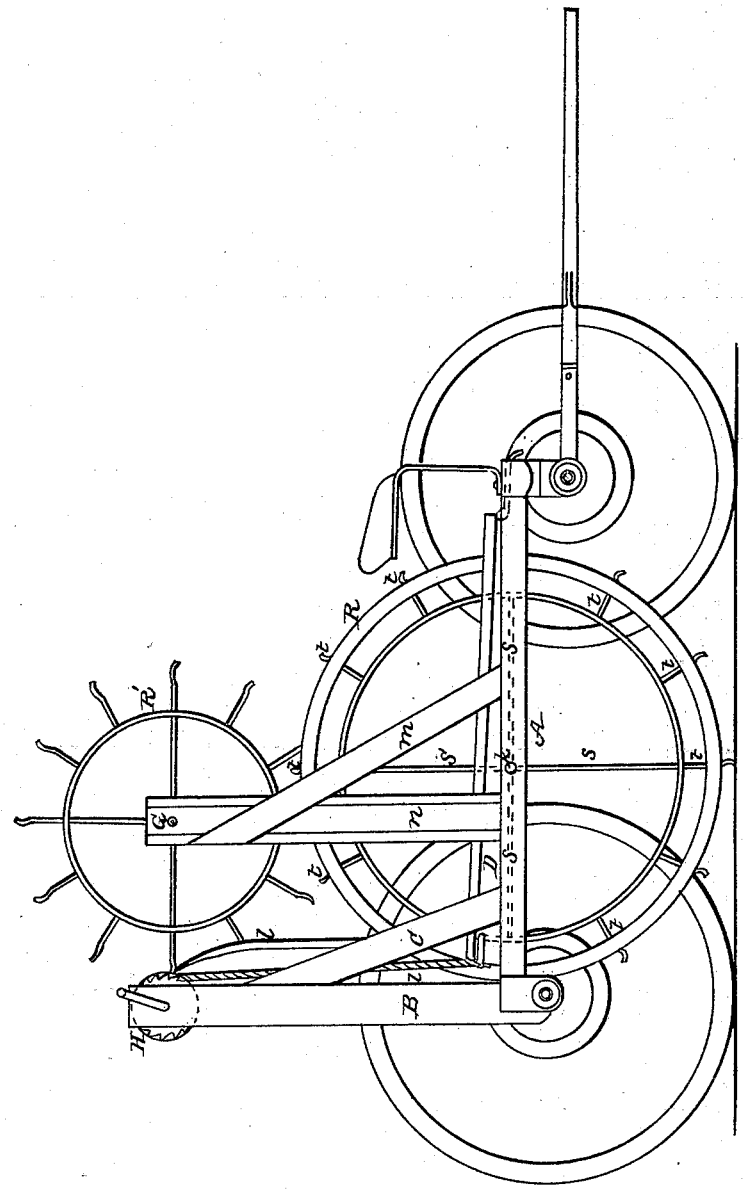
Witnesses:
Inventor:

United States Patent Office.

JAMES W. MILROY, OF GALVESTON, INDIANA.

Letters Patent No. 77,830, dated May 12, 1868.

IMPROVEMENT IN REVOLVING SPADE-PLOUGH.

The Schedule referred to in these Letters Patent and making part of the same.

TO ALL WHOM IT MAY CONCERN:

Be it known that I, JAMES W. MILROY, of Galveston, in the county of Cass, and State of Indiana, have invented certain new and useful Improvements in Revolving Plough and Cultivator; and I do hereby declare that the following is a full, clear, and exact description thereof, reference being had to the accompanying drawings, and to the letters of reference marked thereon, which form a part of this specification, in which—

Figure 1 represents a side elevation of my machine.

The nature of this invention consists in arranging two series of spade-wheels in the manner hereinafter set forth.

To enable others skilled in the art to make and use my invention, I will now describe its construction and operation.

The frame of my machine consists in the side-pieces A A and uprights B B, which are strengthened by braces c c. The frame is designed to rest on the axles of a common wagon, the front end of said frame acting as a bolster, to enable the fore-wheels of the wagon to turn to the right or left.

Inside of the above-mentioned frame is hinged, at its front end, a second frame, D, having on it the uprights n n, strengthened by the braces m m.

k represents an axle, which is pivoted in the opposite sides of frame D. On the said axle are adjusted three wheels R R, supported by arms s s. To the periphery of wheels R R are fastened, in any suitable way, the spades t, which are intended for dividing and pulverizing the clods, so as to render the ground in a proper condition for receiving the seed.

Near the upper ends of uprights n n is the axle G, having on it the same number of spade-wheels R' as is formed on axle k.

It will be observed that the wheels on axle G are made smaller than those on axle k k, and are furnished with spades similar in form to those of k k. It will also be seen that the spades on the upper and lower wheels are made to interlock, so that, when motion is given to the lower wheels, by the spades coming in contact with the earth, the same motion will be imparted to the upper wheels. The object of the upper wheels is to crush or pulverize any earth that may adhere to the surface of the spades on the lower wheels.

To the rear end of frame D the cords v v are attached, the upper ends of said cords being fastened to roller H. In operating said roller by the crank at its end, the cords will place the frame D at the desired angle, and the spades on the lower wheels made to penetrate the soil to the desired depth.

It may be found advantageous, at times, to substitute forks, with three or four tines, in place of the spades above described.

l designates a pawl, pivoted to the inner side of one of the braces c c of the frame A. Said pawl is designed to fit into the serrated part of the roller H, in order to prevent it from revolving when necessary.

What I claim as new, and desire to secure by Letters Patent, is—

1. In a revolving spade-plough, the hinged frame D, operating substantially as and for the purpose set forth.

2. The employment of one or more revolving ploughs or forks, arranged to operate substantially as described.

3. I claim the combination of the lower spade or forked wheels R R, with the upper wheels R' R' gearing therein, substantially in the manner and for the purpose set forth.

4. I claim the combination of the frame A, roller H, pawl l, and cords v v, all arranged and operating substantially as and for the purpose specified.

In testimony that I claim the foregoing as my own, I affix my signature in presence of two witnesses.

J. W. MILROY

Witnesses:
R. H. MILROY,
JOHN H. GOULD.